(12) United States Patent
Wey

(10) Patent No.: US 11,005,816 B2
(45) Date of Patent: May 11, 2021

(54) ADAPTIVE AND DYNAMIC NETWORK PROVISIONING

(71) Applicant: RELAY WIRELESS NETWORK, LLC, Dallas, TX (US)

(72) Inventor: Alexander Richard Perry Wey, Dallas, TX (US)

(73) Assignee: RELAY WIRELESS NETWORK, LLC, Dallas, TX (US)

(*) Notice: Subject to any disclaimer, the term of this patent is extended or adjusted under 35 U.S.C. 154(b) by 321 days.

(21) Appl. No.: 16/208,982

(22) Filed: Dec. 4, 2018

(65) Prior Publication Data

US 2019/0173847 A1    Jun. 6, 2019

Related U.S. Application Data

(60) Provisional application No. 62/595,040, filed on Dec. 5, 2017.

(51) Int. Cl.
*H04L 29/06* (2006.01)
*H04L 12/24* (2006.01)

(52) U.S. Cl.
CPC ...... *H04L 63/0272* (2013.01); *H04L 41/0806* (2013.01); *H04L 41/0886* (2013.01); *H04L 63/0876* (2013.01); *H04L 63/10* (2013.01)

(58) Field of Classification Search
CPC ............ H04L 63/0272; H04L 41/0806; H04L 41/0886; H04L 63/0876; H04L 63/10; H04L 12/4641
See application file for complete search history.

(56) References Cited

U.S. PATENT DOCUMENTS

| | | | |
|---|---|---|---|
| 2008/0159242 A1* | 7/2008 | Rayzman | H04W 84/12 370/338 |
| 2016/0014128 A1* | 1/2016 | Perrone, II | H04L 63/0892 726/7 |
| 2016/0073327 A1* | 3/2016 | Clougherty | H04L 12/4641 370/254 |
| 2019/0081931 A1* | 3/2019 | Slutsker | H04L 63/0892 |

* cited by examiner

*Primary Examiner* — Yogesh Paliwal
(74) *Attorney, Agent, or Firm* — Barnes & Thornburg LLP

(57) ABSTRACT

Disclosed embodiments provide a tool and methodologies for increasing security, and ease-of-access for a computer to connect privately to a specific network and or series of network-based services via a network access point without additional setup or configuration operations required of a user of the computer. In accordance with at least some disclosed embodiments, a mechanism and methodologies are provided for adaptive and dynamic provisioning of network devices for private access to network-based services for computers in a real-world environment.

20 Claims, 5 Drawing Sheets

ADAPTIVE AND DYNAMIC NETWORK PROVISIONING

CROSS REFERENCE AND PRIORITY CLAIM

This patent application claims priority to U.S. Provisional Application No. 62/595,040 filed Dec. 5, 2017, entitled "AUTOMATED PRIVATE WIRELESS NETWORK PLATFORM," the disclosure of which being incorporated herein by reference in its entirety.

FIELD

Disclosed embodiments relate to automation of logical networks within the network devices, systems, and/or infrastructure of telecommunications and/or computer networks to adapt to the users and their device(s) connected to, or attempting to connect to a part of the network infrastructure to enable private connectivity for that user and their network-enabled device(s) in a real-world environment.

BACKGROUND

An Access Point ("AP") is a network infrastructure device in a physical location where network-enabled devices may obtain access to telecommunications or computer network, for example, a Local Area Network ("LAN"), Wide Area Network ("WAN"), or the Internet. This access occurs using either wired or wireless networking protocols (e.g., Ethernet or Wi-Fi) to connect a computer (e.g. computer, laptop, smartphone, etc., collectively, "Computer devices") to an AP that is connected to a LAN, WAN, the Internet and/or one or more private Intranets (collectively, "Networks"). An AP and/or one of the network infrastructure elements (collectively, "Network Devices") control access to a Network and perform functions such as authentication, encryption, segmentation, etc. to facilitate the connection(s) made by Computers. Network Devices may be located in a variety of physical locations to enable users at the locations to connect to a Network, including but not limited to indoor offices, homes, hotels, retail locations, travel locations, outdoor public places, etc.

In telecommunications and computer networking, when two or more Computers join the same Network, they enable a connection between them, either logically, or physically. This connection enables communication between the Computers. These connections are typically organized via protocols and standards, organized and managed by multiple governing bodies within the telecommunications and computer networking community. Standards are typically outlined in Requests for Comments ("RFC") publications from governing bodies such as the Internet Engineering Task Force ("IETF") and Internet Society ("ISOC"), and the Institute of Electrical and Electronics Engineers ("IEEE"), among others. Specifically, the IEEE sets out specifications widely used in networks, known as IEEE 802. Within 802 are standards outlining wired connections (802.3 Ethernet) and wireless connections (802.11).

Typically, Network Devices enable connections to multiple Networks, and then assign access to each Network based on which Device (and corresponding user) is trying to connect. (For example: hotels may make a guest Wi-Fi network with Internet connectivity available to its guests during their stay at the hotel, but those guests do not have access to the LAN). In scenarios where guest users exist, Computers from guests may all connect to the same Network together (e.g. Guest_Wi-Fi_Network), rather than having a Network for each guest (for example, Network_1 for guest 1, Network_2 for guest 2, etc.). These connections are typically shared by all of the guests, regardless of their background, creating a shared network connection between all of the guest Devices.

While communication between Computers is traditionally the goal of joining a Network, the connection of two or more Computers that do not wish to be connected can have unintentional negative security consequences as the Computers are now able to communicate directly, even if they do not wish to do so.

While guests may join a dedicated guest Network to access things like the Internet, they almost never wish to connect their Computers to other Computers that they do not know. These guest networks are typically under-secured due to a number of aspects including, but not limited to, network sharing, shared passwords, no encryption, non-unique encryption, limited user visibility to a Network, and limited Network visibility to the user, among others. As such, Computers in guest environments may be vulnerable to privacy and security issues including, but not limited to eavesdropping, hacking, hijacking, identify theft, including theft of sensitive information such as credit card numbers, passwords, emails, photos, etc.

While there are certain security mechanisms that exist to prevent certain security concerns (e.g. Wi-Fi Protected Access version 2 ("WPA2"), Virtual Local Area Networks ("VLAN")), platforms that use the most optimal combination of these security mechanisms do not exist that ensure the highest level of privacy and security.

By creating a private Network on the Network Device that is segmented from other Networks and other Computers, a guest user, their Computer may connect privately without fear of unwanted connections to other Computers. And by offering a user-specific private network, the user may trust that their Computer's connection is unique, private, and secured.

SUMMARY

The following presents a simplified summary in order to provide a basic understanding of some aspects of various invention embodiments. The summary is not an extensive overview of the invention, nor intended to identify key or critical elements of the invention, nor to delineate the scope of the invention. The following summary merely presents some concepts of the invention in a simplified form as a prelude to the more detailed description below.

Based on the description in the Background section, there remains a need for additional security and privacy measures to protect users on a shared Network because of the inherent vulnerabilities of network sharing.

Disclosed embodiments provide a tool and methodologies for increasing security and privacy for a Computer connected to a Network Device, without additional setup or configuration operations required of a user of the Computer.

In accordance with at least some disclosed embodiments, a mechanism and methodologies are provided for the adaptive and dynamic network provisioning of a Network on a Network Device in a real-world environment to deliver increased security and privacy as compared to current practices.

In accordance with at least some disclosed embodiments, a mechanism and methodologies are provided for adaptive and dynamic provisioning of a Network on a Network Device to match to a specific user and his Computers to a specific private Network, based on information stored within an associated user account with registered Computers.

In accordance with at least some disclosed embodiments, a mechanism and methodologies are provided for adaptive and dynamic provisioning of Network Devices in the same physical location at the same time as the user and his Computers are present based on an analysis of the connected or connectable Computers using widely accepted telecommunications and computer networking standards and practices.

BRIEF DESCRIPTION OF THE FIGURES

In order to describe the manner in which the above-recited and other advantages and features of the disclosure may be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
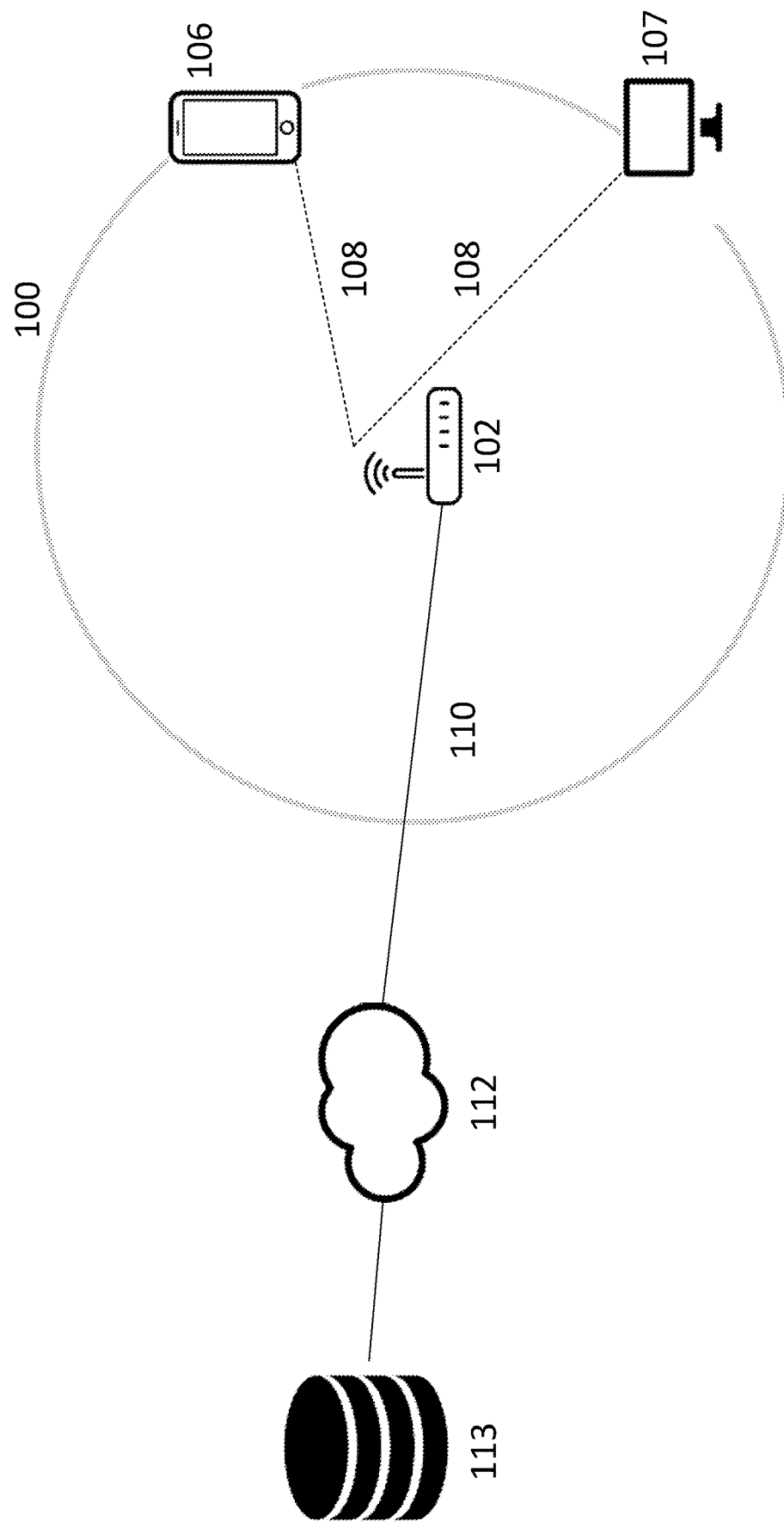
FIG. 1 illustrates an example of a conventionally known shared network environment.

Various embodiments of the disclosure are discussed in detail below. While specific implementations are discussed, it should be understood that this is done for illustrative purposes only. A person skilled in the relevant art will recognize that other components and configurations may be used without parting from the spirit and scope of the disclosure.

Thus, the following description and drawings are illustrative and are not to be construed as limiting. Numerous specific details are described to provide a thorough understanding of the disclosure. However, in certain instances, well-known or conventional details are not described to avoid obscuring the description. References to "one embodiment" or "an embodiment" in the present disclosure may be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used unless otherwise specified and defined.

Alternative language and synonyms may be used for any one or more of the terms discussed herein, and no special significance should be placed upon whether or not a term is elaborated or discussed herein. In some cases, synonyms terms are provided. A recital of one or more synonyms does not exclude the use of other synonyms.

The use of examples anywhere in this specification including examples of any terms discussed herein is illustrative only and is not intended to further limit the scope and meaning of the disclosure or of any example term. Likewise, the disclosure is not limited to various embodiments in this specification.

Without intent to limit the scope of the disclosure, examples of instruments, apparatus, methods and their related results according to the embodiments of the present disclosure are provided herein. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Technical utility, features and advantages of the disclosed embodiments are set forth herein as well as being understood to one of ordinary skill in the art based on this disclosure. Further, the technical utility, features and advantages of the disclosed embodiments may be realized and obtained using the instruments and combinations particularly pointed out in the appended claims and will become more apparent from the following description and appended claims or may be learned by the practice of the principles set forth herein.

Herein, terms may be used to more easily and concisely describe aspects of the disclosed embodiments. The terms are defined below, however, when examples are given, those examples are not meant to be exhaustive or completely representative of all possible examples of that term. Terms used throughout the disclosed embodiments include:

"Networks" may refer to any type of physically or virtually connected telecommunications and/or computer networks created for the purpose of computer communications, including, but not limited to Local Area Networks ("LAN"), Personal Area Networks ("PAN"), Wide Area Networks ("WAN"), Wireless Local Area Networks ("WLAN"), Virtual Local Area Networks ("VLAN"), Body Area Networks ("BAN"), Wireless Body Area Networks ("WBAN"), Metropolitan Area Networks ("MAN"), Virtual Private Networks ("VPN"), the Internet, and/or personal or private Intranets.

"Network Protocols" may refer to any of, a combination of, or all of the following standard telecommunications and computer networking protocols, including, but not limited to LAN protocols, such as IEEE 802.3 Ethernet and IEEE 802.11 Wi-Fi, PAN protocols such as ZigBee, Bluetooth, and Bluetooth Low-Energy ("BLE"), BAN protocols such as Time Division Multiple Access ("TDMA"), MAN protocols such as IEEE 802.16 Wi-Max, WAN protocols such as Multiprotocol Label Switching ("MPLS"), and VPN protocols such as Generic Routing Encapsulation ("GRE") and Internet Protocol Security ("IPSec"), among others.

"Network Devices" may refer to any one part, combination of parts, or parts as a whole, including, but not limited to, both physical forms and virtual (hosted) forms of wireless Access Points ("AP"), network switches, network routers, modems, firewalls, security devices, wireless controllers, and network controllers, among other telecommunications and computer networking devices, and any corresponding network infrastructure including, but not limited to, the wired cables and cords and/or wireless connections that connect any or all of the above within a physical location that enable telecommunications and computer networking.

"Network Services" may refer to any one action, combination of actions, or entire actions, including, but not limited to, accessing local, cloud, or remote file servers, accessing a private Intranet across a WAN or the Internet (i.e. establishing a VPN connection), accessing the Internet and/or some Intranet information services, accessing Internet and/or some Intranet file storage, Internet and/or some Intranet server access and communication, accessing and/or communicating with some Internet and/or Intranet application, using Internet and/or Intranet data sharing and storage, etc.

"Computers" may refer to any network-enabled communications device for use within a telecommunications and computer network, including, but not limited to, personal computers ("PC"), laptops, smartphones, tablets, personal digital assistants ("PDA"), Internet-connected devices ("IoT Devices"), among others.

"Users" may refer to the operator, or operators of Computers, attempting to obtain, or successfully obtaining access to a Network via a Network Device for purposes of accessing or performing Network Services.

"Guest Users" may refer to a User that does not have any control of the Network Device(s) to which it wishes to connect. For example, a Guest User may be a User in a hotel environment that wishes to connect to the Wi-Fi Network offered through the hotel's Network Devices. The hotel controls the Network Device in this instance and the User wishing to connect may be a Guest User.

"Environment" may refer to a physical or virtual space or set of connections where a User is trying to, or has successfully, connected to a telecommunications and computer network. For example, a User in the same physical area as a Network Device attempts to join a Network. The physical area may be referred to as an Environment. In another example, the wireless airwaves within the space that form a Network may also be referred to as an Environment. Unless otherwise stated, for purposes of the disclosed embodiments, an Environment also incorporates an element of time, typically, the same time when a User is in the same physical area as a Network Device.

"PN" is an acronym for Private Networks. A Network that is organized and/or configured in a certain manner, including establishing or blocking specific connections to the Internet, VPNs, and or private Intranets will be referred to as a PN.

"APN" is an acronym for Automated Private Networks. When a Network is dynamically and automatically provisioned to match a User, it will be referred to as an APN.

"MND" is an acronym for Managed Network Devices. When Network Devices are managed to enable adaptive and dynamic provisioning, they will be referred to as MND.

"ADP" is an acronym for Adaptive and Dynamic Provisioning. When Network Devices are managed to enable APNs, the method of enabling APNs may referred to as ADP.

"UID" is an acronym for Unique Identifier, which are used, with respect to the disclosed embodiments, to identify a specific Computer and/or Network Device. A UID may be used to enable ADP and controlling and enabling access of a specific Computer, and its corresponding User, to a specific PN on a specific Network Device in an Environment. UIDs may be any of, a combination of, or all of the following, including but not limited to, the Computer's Bluetooth address, Media Access Control ("MAC") address, Wi-Fi address, Internet Protocol ("IP") address, Serial Number, International Mobile Station Equipment Identity ("IMEI"), Integrated Circuit Card Identifier ("ICCID"), Mobile Equipment Identifier ("MEID"), Secure Element Identifier ("SEID"), among others, that are specific to that Computer or Network Device.

Disclosed embodiments pertain to the Adaptive and Dynamic Provisioning of Network Devices in a real-world telecommunications and computer network Environment to match the desired Private Network to a specific User in that Environment. The Adaptive and Dynamic Provisioning of Network Devices to create a PN that matches a User and then enable the connection of that User to that PN, provides superior security, privacy, and overall User experience in shared Environments with one or more Guest Users (i.e., Users that do not own or manage the Network Devices themselves) when trying to perform any Network Services.

In accordance with at least some disclosed embodiments, technical utility is provided that extends beyond that available using conventional Network security features (e.g. encryption) for Users connecting to Networks Devices in shared, guest Environments.

For example, in addition to performing conventional Network security features, disclosed embodiments provide additional security features, such as automatic segmentation of Computers through APNs.

More specifically, a conventional, shared Network serves the entire local population for accessing Network Services and that Network's Network Devices establish a connection between all Computers on that Network, with no segmentation. All Computers on that Network are also treated equally, with no delineation of Network Services based on the User or their Computers. Alternatively, a PN serves a subset of the local population to further control Network Services as well as providing incremental security and privacy for Users in that Environment.

To support the enablement of PNs, disclosed embodiments outline the Adaptive and Dynamic Provisioning of the Network Devices to create PNs that are specific to Users in that Environment, thereby enhancing the security and privacy of the Computers and their Users and improving control and access to Network Services.

Disclosed embodiments provide this level of User-specific connectivity and security by examining and analyzing the UID of real-world Computers in order to manage and control access to a specific PN on a specific Network Device. More specifically, in accordance with the disclosed embodiments, PNs can be Dynamically and Automatically Provisioned on Network Devices by matching a Computer's UID to a list of allowable Computers to a given PN in an Environment. These Managed Network Devices create a specific PN in an Environment to enable secure and private access to that PN and any corresponding Network Services.

UIDs are typically included in standard communications from Computers during standard telecommunication and computer Network Protocols. For example, some Computers emit "beacons" for purposes of identifying Network Devices in an Environment. Within these beacons, a UID may be transmitted and received by the Network Device for purposes of establishing a connection. Computers may also include a UID when establishing a Wi-Fi connection or during ongoing Wi-Fi communications with a Network Device.

Thus, disclosed embodiments may be utilized to identify a Computer, and its User, via the UID, and then Dynamically and Automatically Provision a corresponding PN on the Network Device to enable private and secure communications and control access to Network Services.

As a result, technical utility is available for Users of Computers in shared, guest Environments; for example: shared workspaces, hotels, airports, universities, public venues, multi-tenant commercial and residential buildings, retail locations, public facilities, etc.

As mentioned above, shared, guest Networks that are available to the Guest Users in an Environment are convenient and easy to connect but are usually under-secured and present security risks to the Users in that Environment because they are not adequately segmented, encrypted, or managed to control access to certain Network Services.

Thus, in accordance with disclosed embodiments, by Dynamically and Automatically Provisioning Network Devices, to create a PN that corresponds to a Computer, and its User, increased privacy, security, and a more favorable User experience may be realized. For example, additional privacy measures may include optimized segmentation of Computers connected to Network Devices in an Environment. Additional security measures may include unique encryption for different Users. For example, when Users connect to the same Wi-Fi Network on the same Network Devices in an Environment, the same encryption key is used to encrypt wireless data communications between the Computer and the Network Device. If Users use a unique PN, then unique encryption may be achieved. Also, by matching Users to PNs in an Environment, additional insights may be achieved regarding the Environment, thus reducing the risk of eavesdropping, hacking, theft of private information, etc. For example, if a malicious person sets up a fake access point in a shared, guest environment, a User may inadvertently connect to the incorrect access point, rather than a secured access point. By implementing ADP, the User can be assured that the PN that its Computer attempt to connect is a secured access point because only MND broadcast the correct PN information.

The disclosed embodiments may be used in a plurality of physical locations in a building, facility, or other defined areas, etc. By identifying the User via a Computer's UID, the PN may be enabled on a specific Network Device or a series of Network Devices in an Environment.

Such ADP of a Network Device to deliver a PN ensures that from the perspective of the Computer, and its User, that the PN is the same communication network, regardless of Environment, so long as that environment is using ADP. This enables the ability to effectively offer and manage a single set of credentials for the Computer, and its User, improve usability while maintaining security as a User moves from one Environment to another.

FIG. 1 illustrates a network Environment 100 provided in accordance with a disclosed embodiment of a publicly available WLAN 108. WLAN 108 is a publicly available shared, guest wireless Network (e.g., a wireless hotspot available in coffee shops, airports, libraries, etc.) Computers 106 and 107 may connect to AP 102 through shared WLAN 108 (i.e., a shared, guest Network). AP 102 may then connect to the Internet 112 and then Network Service 113 via connection 110.

Publicly available and accessible WLAN 108 generally has no segmentation and, as such, the data transmitted from one or more Computers (106 and/or 107) to the AP 102 through shared Network 108 may be considered unsecure (e.g., may be eavesdropped, hacked, hijacked, susceptible to private information being stolen, etc.) because it is shared.

Figure 2:
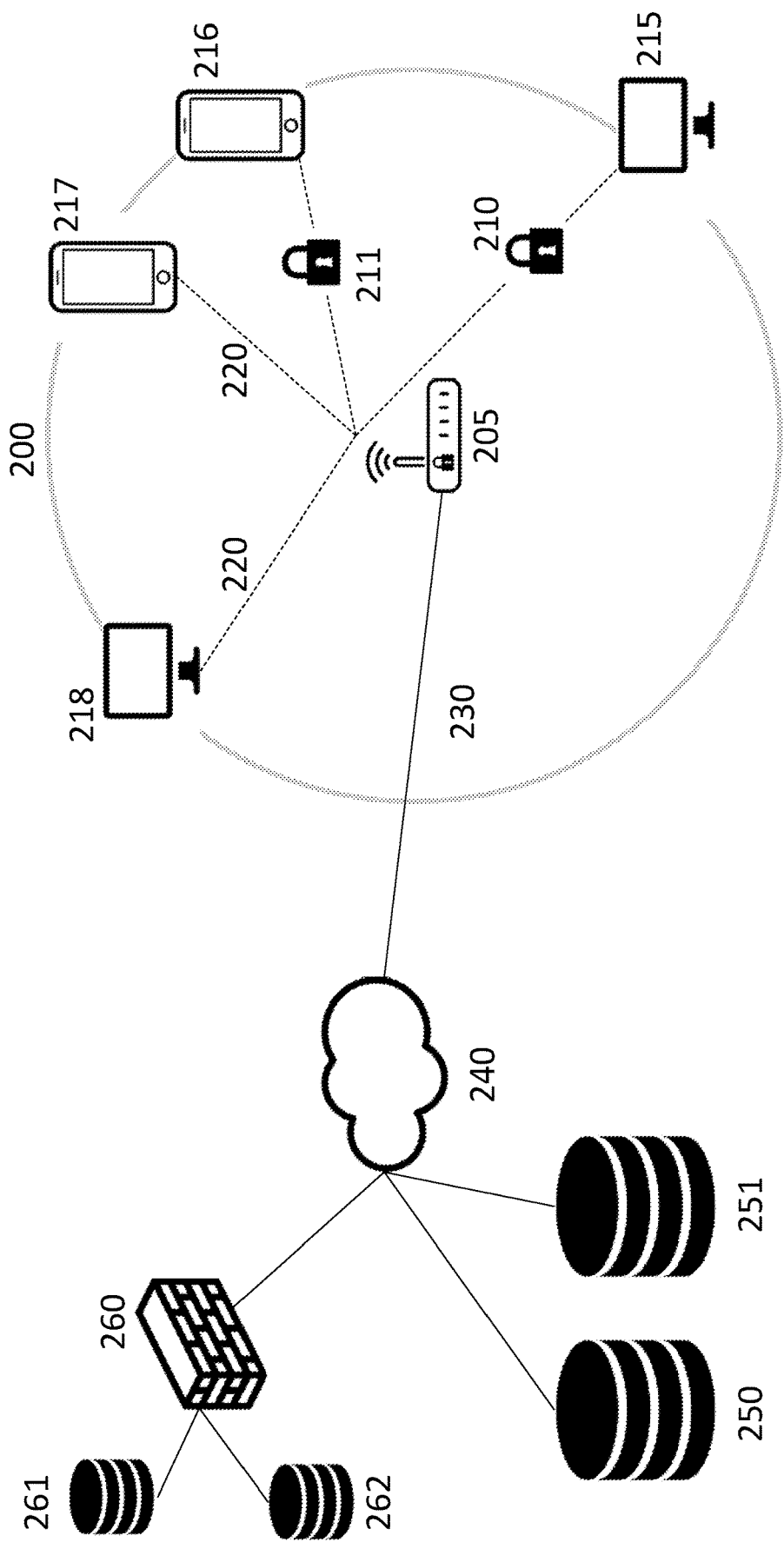
FIG. 2 illustrates an example of a dynamically segmented and private network environment provided in accordance with the disclosed embodiments.

FIG. 2 illustrates a network Environment 200 provided in accordance with the disclosed embodiments. Connections 210 and 221 are Private Networks via WLAN protocols and Connection 220 is a publicly available shared, guest Network via WLAN protocols. Accordingly, Computers 215 and 216 may connect to MND 205 through PN WLAN 210 and PN WLAN 211, respectively whereas Computers 217 and 218 connected to shared, guest Network WLAN 220, together.

In accordance with at least some disclosed embodiments, the PN WLAN 210 and PN WLAN 211 will have additional privacy and security as compared to shared, guest WLAN 220. MND 205 may be connected to the Internet 240 and may coordinate the Network Service 250 and Network Service 251 for use for PN WLAN 210 and PN WLAN 211, respectively, whereas shared, guest WLAN 220 may not receive access to either Network Service 250 nor Network Service 251. MND 205 may use an authentication server 260 with a corresponding database 261 to organize unique identifiers of Computers, Users, Network Devices, Network Services, Private Networks and use server 262 to coordinate the ADP of Network Devices.

The authentication server 260 may then determine, using UIDs, whether the Computer should be authenticated for the purposes of connecting to the MND 205. For example, this may involve the authentication server 260 accessing one or more authentication databases 261. Authentication is the process used to identify and verify a Computer and/or User in a secure manner, e.g., matching the Computer or User's credentials with the credentials stored in the authentication database 261. Thus, upon successful authentication, devices 215 and 216 may securely connect to MND 205 and to their respective Network Services.

In accordance with at least one embodiment, a User may establish an account, service, subscription, or otherwise register their Computer(s) to establish a unique PN, with optional corresponding Network Services, to securely and privately connect to any MNDs. For example, upon a one-time account setup, the user may provide account information, including their Computer's UIDs, either input manually or automatically detected once the Computer is within range of a MND. Such an account, service, or subscription registration may be set up anywhere and anytime the User has access to the Internet and/or access an organizing service that coordinates PNs and MNDs. Thus, the User and their Computer may be in range of a MND to create an account or otherwise register but need not be in range to set up an account. Alternatively, an account may be set to register their device(s) with the authentication service.

Upon establishing an account, the User may configure the Computer to automatically connect to a PN via a MND whenever the Computer is in the Environment of a MND. This configuration selection may be required to be set up only once by the user.

Alternative options to automatically connecting a Computer to a PN may be to require the User to manually connect their Computer to a PN via a MND when in range of a MND, or to only receive a PN after the Computer has attempted to connect to the MND, or to prompt the User (e.g. via a splash page or welcome page) to begin the authentication process of the User and its Computer before receiving the PN.

Figure 3:
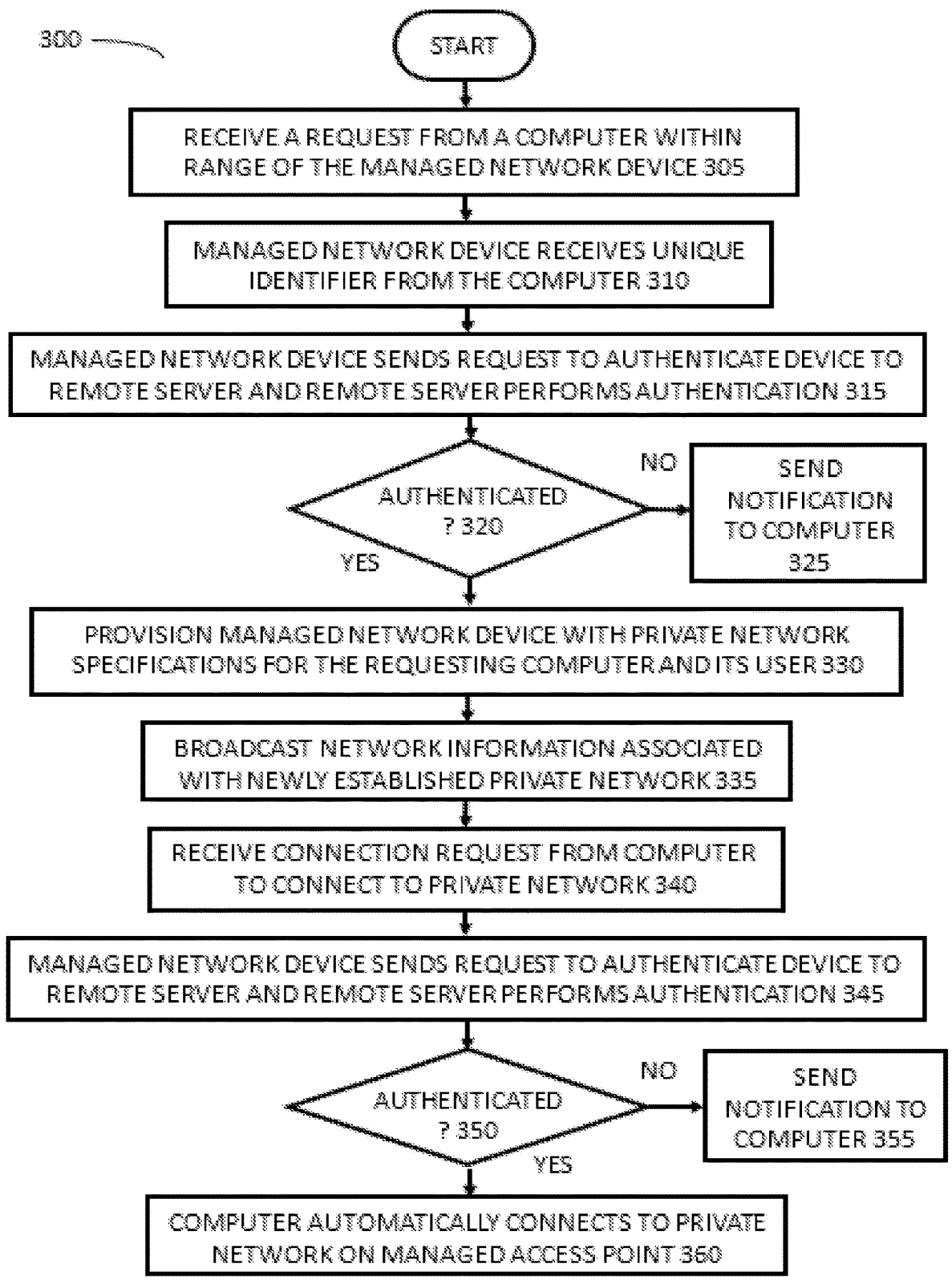
FIG. 3 illustrates a flow chart of an example method for the automated provisioning of a private network provided in accordance with the disclosed embodiments.

FIG. 3 illustrates a flow chart of an exemplary method for providing a PN in accordance with the disclosed embodiments. The method operations shown in FIG. 3 are provided by way of example only because there are a variety of ways to provide the disclosed functionality. Additionally, while the exemplary method is illustrated with a particular order of operations, those of ordinary skill in the art will appreciate that FIG. 3, and the operations shown therein may be executed in any order that accomplishes the technical utility of the presently disclosed embodiments disclosed herein and may include fewer or more operations than those illustrated in FIG. 3.

Each operation in FIG. 3 represents one or more processes, methods or subroutines, carried out in the example method. It should be understood that, optionally, the operations in FIG. 3 may be implemented in network environments such as network environments in FIG. 1 and FIG. 2. The flow chart illustrated in FIG. 3 is described in relation to and with reference to elements of a network such as that disclosed in FIG. 1 and FIG. 2 but operations may be performed by other elements as well.

FIG. 3 shows a flow diagram of an exemplary method 300 for automatically, and without additional User action, connecting a device to a MND so as to enable a PN after which the Computer may connect directly to the PN and receive a secured connection to any corresponding Network Services. Method operations begin at 305, at which a request is received from one or more Computers within an Environment that includes at least one MND.

A Computer, once in range, may detect the one or more broadcasted signals of the MND in the Environment and may transmit a request to connect to MND. As explained above, as part of the automation of connecting to a MND, a User may have pre-registered or otherwise subscribed to a service that enables automated connection to a PN using MNDs.

Accordingly, at 310, the automated request from the Computer may include data (e.g. UID) for authentication to the PN. In another example, the UID may be automatically detected by the MND without a prior connection (e.g. via a wireless beacon). In both examples, there is no additional action required by the User.

Control then proceeds to 315, at which the MND may transmit the UID of the requesting Computer to an authentication server and the authentication server may then determine whether the device should be authenticated to connect to a PN via the MND. For example, this may involve the remote authentication server accessing one or more authentication databases. The authentication database may store data including, but not limited to, information about the Computers, associated user account information, and corresponding authentication information of the Computers (e.g., UIDs).

Control then proceeds to 320, at which a determination may be made as to the authentication of the Computer. For example, the MND may receive a confirmation or denial of the authentication of the Computer from the authentication server. The MND may also receive User account information associated with the User's Computer, along with credentials to enable access to the PN via the MND.

In response to the denial of the authentication of the User's Computer (e.g., the UID of the Computer is not registered within the remote authentication server or database), control proceeds to 325, at which the MND may transmit a notification to the Computer prompting the User to register the Computer or subscribe to the service for access to a PN via the MND. Thereafter, although not shown, instructions may be provided to subscribe, register or otherwise request PN access through MNDs in a manner similar to that discussed above. Alternatively, the User may wish to proceed with a conventional shared, guest Network and may proceed by connecting to said Network.

Returning to operations performed following the successful authentication of the User's Computer, control proceeds to 330, at which the MND may provision a PN associated with the User's Computer.

Control proceeds to 335, where the MND begins to broadcast access to the PN. For example, the MND may broadcast a Server Set Identifier ("SSID") associated with the User's Computer (and User's account associated with said Computer).

For example, the MND may be provisioned and segmented to create a PN. The MND can subsequently create new logical interface(s) on its hardware, firmware, and/or software to enable segmentation on the MND. In this example, each logical interface may broadcast a unique SSID. The MND may create a plurality of logical interfaces, each for transmitting a different SSID. By segmenting the MND into unique PNs, Users may receive adding an extra layer of security (e.g., one Network may not access another Network); this is a private network.

In accordance with disclosed embodiments, each unique SSID may serve as the private network name that is unique and distinguishes itself from other Networks. Because a logical interface or virtual instance is associated with only one SSID, each SSID may be segmented off into its own PN.

Control may then proceed to 340, at which the MND receives a request to connect to the PN by the User's Computer. Control proceeds to 345 when the MND authenticates the User's Computer. The authentication may occur in a number of ways, including but not limited to, with a pre-shared key, a certificate, a third-party authentication server, etc. The MND will then determine if the device is authenticated (350). If the Computer is not authenticated, the MND will send a notification to the device that the credentials were incorrect, and it must attempt to reconnect (355). If the Computer is authenticated successfully, the Computer will automatically connect to the PN on the MND (360).

Optionally, once the User's Computer moves out of the Environment of a MND, the MND may remove the PN, and any corresponding attributes (e.g., SSID) from the allowable and authenticated PNs on the MND. This will also remove the Computer's authentication to the MND, as it relates to the User's PN. The User may still have access to a conventional shared, guest Network. Optionally, the MND may have a predetermined time period for removing the PN, and any corresponding attributes (i.e., to address situations where the User's Computer returns to the Environment of a MND within a specified time period, e.g., ten minutes, half an hour, twenty-four hours). In such situations, for example, re-authentication via the authentication server may not be required.

Figure 4:
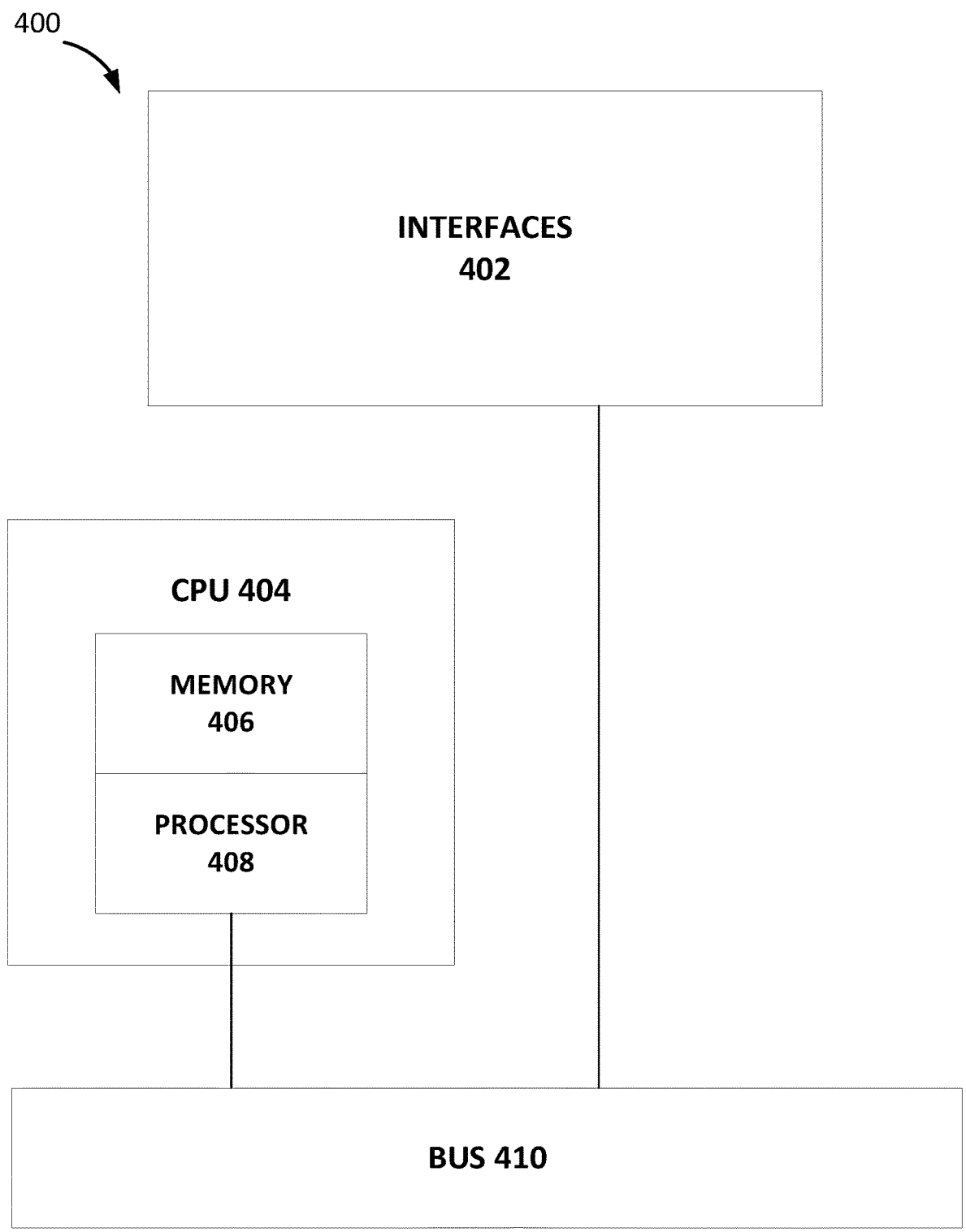
FIG. 4 illustrates an example Network Device provided in accordance with the disclosed embodiments.
Figure 5:
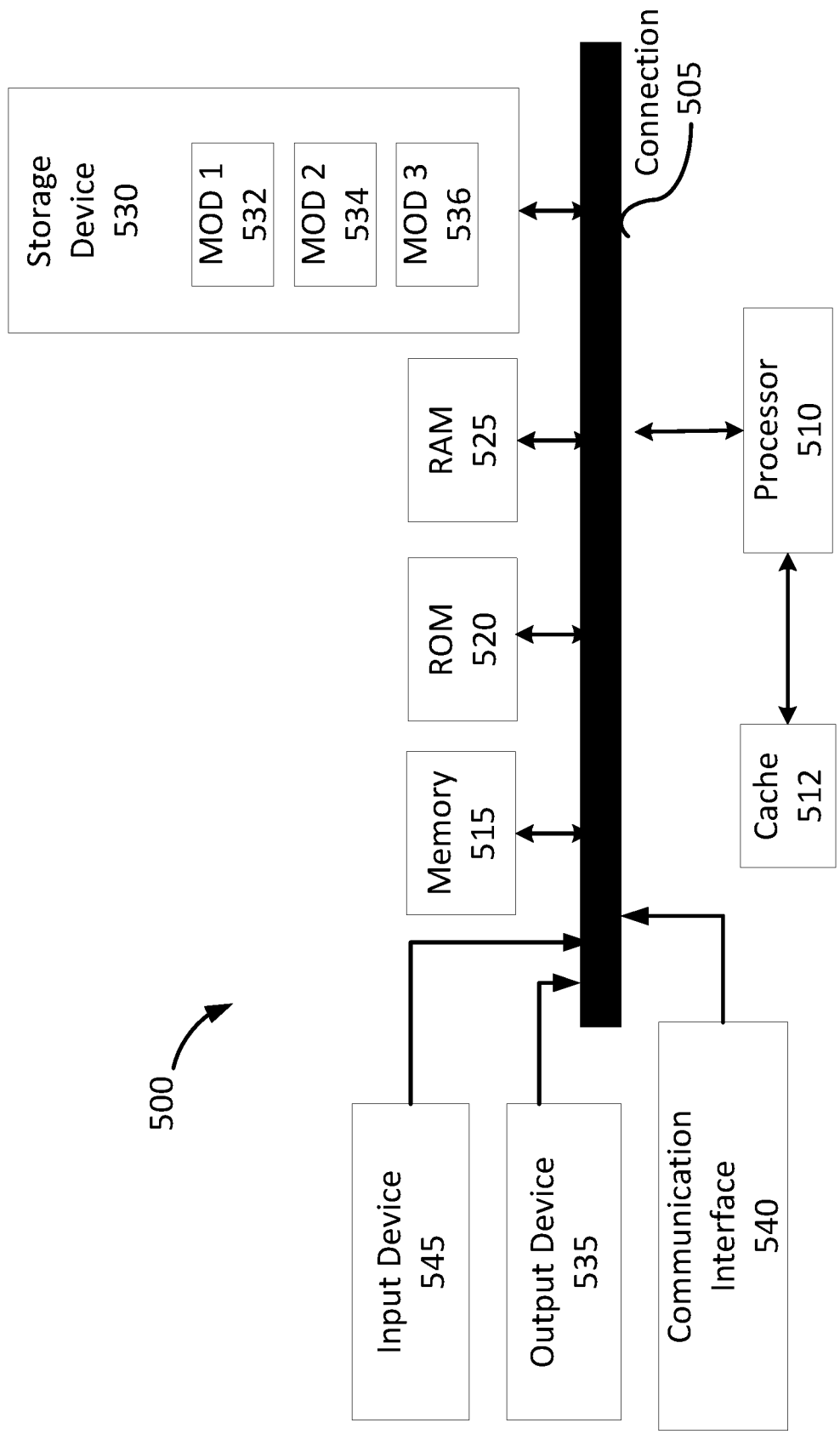
FIG. 5 illustrates an example Computer provided in accordance with the disclosed embodiments.

Turning to FIGS. 4 and 5, those figures illustrate exemplary configuration of a Network Device and a Computer respectively.

FIG. 4 illustrates an example of Network Device 400 suitable for performing switching, routing, load balancing, and other networking operations. Network Device 400 may include a Central Processing Unit (CPU) 404, one or more interfaces 402, and a bus 410 (e.g., a Peripheral Component Interconnect (PCI) bus).

When acting under the control of appropriate software or firmware for providing functionality described herein, the CPU 404 executes packet management, error detection, and/or routing functions. The CPU 404 may accomplish these functions under the control of software including an operating system and any appropriate applications software.

CPU 404 may include one or more processors 408, such as a processor from the INTEL X86 family of microprocessors. In some cases, processor 408 may be specially designed hardware for controlling the operations of Network Device 400. In some cases, a memory 406 (e.g., non-volatile RAM, ROM, etc.) may also form part of CPU 404. However, there are many ways in which memory could be coupled to the device 400.

The interfaces 402 are typically provided as modular interface cards (sometimes referred to as "line cards"). Generally, interfaces 402 control the sending and receiving of data packets over the communication network and may support other peripherals used with the Network Device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, Wi-Fi interfaces, 3G/4G/5G cellular interfaces, CAN BUS, LoRA, and the like.

Generally, these interfaces may include ports appropriate for communication with the appropriate media. In some cases, they may also include an independent processor and, in some instances, volatile RAM. Such independent processors may control such communications intensive tasks as packet switching, media control, signal processing, crypto processing, and management. By providing separate processors for the communications intensive tasks, these interfaces may enable a master microprocessor to efficiently perform routing computations, network diagnostics, security functions, etc.

A Network Device, similar to that shown in FIG. 4 may become a Managed Network Device (and correspondingly offer PN functionality and services as described in the disclosed embodiments) once it is connected to, or controlled by, some type of management service and/or software that adheres to, and executes on, the principles of the disclosed embodiments.

Although the system shown in FIG. 4 is one specific Network Device of the disclosed embodiments, it is by no means the only Network Device architecture on which the disclosed embodiments may be implemented. For example, an architecture having a single processor that handles communications as well as routing computations, etc., may be used. Further, other types of interfaces and media may also be used to implement the Network Device 400.

Regardless of the configuration of the Network Device 400, the device 400 may employ one or more memories or memory modules (including memory 406) configured to store program instructions for both general-purpose network operations and mechanisms for roaming, route optimization and routing functions as well as the special purpose network operations of the disclosed embodiments described herein. Such program instructions may control the operation of an operating system and/or one or more applications, for example. The memory or memories may also be configured to store tables such as mobility binding, registration, and association tables, etc. Memory(s) 406 may also store various software containers and virtualized execution environments and data.

The Network Device 400 may also include one or more Application-Specific Integrated Circuits (ASICs), which may be configured to perform routing and/or switching operations. The ASIC(s) may communicate with other components in the Network Device 400 via the bus 410, to exchange data and signals and coordinate various types of operations by the Network Device 400, such as routing, switching, and/or data storage operations, for example.

FIG. 5 illustrates a Computer 500 wherein the components of the Computer are in electrical communication with each other using a connection 505, such as a communication bus. Exemplary Computer 500 may include a processing unit (CPU or processor) 510 and the connection 505 that couples various device components for control and communication; such components may include the memory 515, e.g., ROM 520, and RAM 525, to the processor(s) 510.

The Computer 500 may optionally include a cache 512 of high-speed memory connected directly with, in close proximity to, or integrated as part of the processor(s) 510. The system 500 may copy data from the memory(s) 515 and/or the storage device 530 to the cache 512 for quick access by the processor(s) 510. In this way, the cache may provide a performance boost that avoids processor(s) 510 delays while waiting for data. These and other modules may control or be configured to control the processor(s) 510 to perform various actions. Other system memory 515 may be available for use as well. The memory(s) 515 may include multiple different types of memory with different performance characteristics. The processor(s) 510 may include any general purpose processor and a hardware or software service, such as service 1 532, service 2 534, and service 3 536 stored in storage device 530, configured to control the processor(s) 510 as well as a special-purpose processor where software instructions are incorporated into the actual processor design. The processor(s) 510 may be a completely self-contained computing system, containing multiple cores or processors, a bus, memory controller, cache, etc. A multi-core processor may be symmetric or asymmetric.

To enable user interaction with the Computer 500, an input device 545 may represent any number of input mechanisms, such as a microphone for speech, a touch-sensitive screen for gesture or graphical input, keyboard, mouse, motion input, speech and so forth. An output device 535 may also be one or more of a number of output mechanisms known to those of skill in the art. In some instances, multimodal systems may enable a user to provide multiple types of input to communicate with the Computer 500. The communication interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media, which may store data that are accessible by a computer, such as magnetic cassettes, flash memory cards, solid-state memory devices, digital versatile disks, cartridges, RAMs 525, ROMs 520, and hybrids thereof. The storage device 530 may include services 532, 534, 536 for controlling the processor(s) 510. Other hardware or software modules are contemplated. The storage device 530 may be connected to the system connection 505. In one aspect, a hardware module that performs a particular function may include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, operations or routines in a method embodied in software, or combinations of hardware and software.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data, which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures may comprise hardware, firmware and/or software, and may take any of a variety of form factors. Typical examples of such form factors include laptops, smart phones, small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A computer-implemented method for automating adaptive network provisioning of telecommunications and computer network infrastructure to establish a Private Network (PN) connection to a local or remote network, Internet, or private Intranets corresponding to user(s) and their devices in a same physical area as the computer network infrastructure, the method comprising:
   receiving, at a Managed Network Device (MND), a signal from a network-enabled user computer device within range of, or connected to, the MND, the signal including a Unique Identifier (UID) of the network-enabled user computer device;
   automatically initiating an authentication protocol for the network-enabled user computer device, wherein an authentication request is sent by the MND to an authentication server to authenticate whether the network-enabled user computer device is authenticated for PN access, and wherein the authentication request includes the UID of the network-enabled user computer device attempting to establish a PN connection via the MND;
   receiving from the authentication server, an indication whether the network-enabled user computer device is authenticated for PN access, and specifically to which PN access is authenticated;
   configuring the MND to create the corresponding PN specifically for the network-enabled user computer device requesting the PN;
   configuring any necessary network connections or network settings required by the PN;
   broadcasting, by the MND, the network information of the PN;
   receiving, from the network-enabled user computer device, a request to connect to the PN; and
   automatically authenticating and connecting the network-enabled user computer device to the PN on the MND.

2. The method of claim 1, wherein the PN provides private access to some network services, that include one action, a combination of actions, or entire actions, including accessing local, cloud, or remote file servers, accessing a private Intranet across a Wide Area Network (WAN) or the Internet, whether via establishment of a Virtual Private Network (VPN) connection or otherwise, accessing the Internet and/or some Intranet information services, accessing Internet and/or some Intranet file storage, Internet and/or some Intranet server access and communication, accessing and/or communicating with some Internet and/or Intranet application, using Internet and/or Intranet data sharing and storage.

3. The method of claim 1, wherein a centralized management database establishes a connection to and/or delivers instructions to the MND for purposes of managing the adaptive network provisioning, including automated establishment of any necessary Network Services linked to the PN.

4. The method of claim 1, wherein the PN provides a private connection that utilizes segmentation within the MND to divide the computer network infrastructure into a plurality of segments for access by each of a plurality of unique Users and their network-enabled user computer devices.

5. The method of claim 3, wherein the MND dynamically and automatically provisions network interfaces and virtually segments the hardware, firmware, and/or software of the MND, to establish the PN.

6. The method of claim 1, wherein the PN is associated with a user account and registered computer devices associated with the user account.

7. The method of claim 1, wherein the network-enabled user computer device is a network-enabled device that adheres to a widely accepted telecommunications and computer networking standards and protocols including Institute of Electrical and Electronics Engineers (IEEE) Standard 802.

8. The method of claim 1, wherein the UID is one or more of, a Bluetooth address, Media Access Control (MAC) address, Wi-Fi address, Internet Protocol (IP) address, Serial Number, International Mobile Station Equipment Identity (IMEI), Integrated Circuit Card Identifier (ICCID), Mobile Equipment Identifier (MEID), Secure Element Identifier (SEID) specific to each network-enabled user computer device.

9. The method of claim 1, wherein the access to the PN enables private access to one or more Network Services via one or more MNDs in an automated fashion.

10. The method of claim 9, wherein the private access is enabled without requiring a user to enter access credentials for a network-enabled user computer device requesting the corresponding PN and/or access to that PN every time the network-enabled user computer device encounters a new MND.

11. A Managed Network Device (MND) comprising a processor and a memory, wherein the MND enables automated adaptive network provisioning and segmentation of a Private Network (PN) and subsequent authentication of corresponding network-enabled user computer devices for access to a specific PN, wherein this MND:
  receives an authentication request from a computer device, wherein the authentication request includes a Unique Identifier (UID) of the network-enabled user computer device within range of, or connected to, the MND;
  automatically provisions and segments a PN related specifically to a user and the user's network-enabled user computer devices;
  generates and transmits an indication whether the network-enabled user computer device is authenticated to access the PN such that the MND coordinates the authentication of the user's network-enabled user computer device;
  manages and controls the access and the connection to the PN by the user's network-enabled user computer device from a successful authentication; and
  receives instructions on how to manage and control the MND, PN, connections to Network Services, and authentication requests from a centralized management database.

12. The MND of claim 11, wherein the MND creates the PN that provides private access to Network Services via the MND.

13. The MND claim 11, wherein the centralized management database establishes a connection to the MND for purposes of managing the entire process including the automated provisioning of PNs.

14. The MND claim 13, wherein the centralized management database establishes the connection to and/or delivers instructions to the MND for purposes of managing the adaptive network provisioning, including the automated establishment of any necessary Network Services linked to the PN.

15. The MND of claim 11, wherein the configuration of the MND provides a private connection that utilizes segmentation within the MND to divide the computer network infrastructure into a plurality of segments for access by each of a plurality of unique users and their network-enabled user computer devices.

16. The MND of claim 15, wherein the MND dynamically and automatically provisions network interfaces and virtually segments hardware, firmware, and/or software of the MND, to establish the PN.

17. The MND of claim 16, wherein the MND segmentation and interfaces are associated with a user account and associated, registered network-enabled user computer devices.

18. The MND of claim 11, wherein the unique device identifier is one or more of a Bluetooth address, Media Access Control (MAC) address, Wi-Fi address, Internet Protocol (IP) address, Serial Number, International Mobile Station Equipment Identity (IMEI), Integrated Circuit Card Identifier (ICCID), Mobile Equipment Identifier (MEID), Secure Element Identifier (SEID) specific to each real-world device.

19. The MND of claim 11, wherein the access to the PN enables private access to one or more Network Services via one or more MNDs in an automated fashion.

20. The MND of claim 19, wherein the PN access is enabled without a user being required to enter access credentials for a network-enabled user computer device requesting the corresponding PN and/or access to that PN every time the network-enabled user computer device encounters a new MND.

* * * * *